(12) United States Patent
Bartley et al.

(10) Patent No.: US 11,064,077 B1
(45) Date of Patent: Jul. 13, 2021

(54) DIGITAL FAXING THROUGH EXISTING FAX SERVERS

(71) Applicant: Biscom, Inc., Westford, MA (US)

(72) Inventors: George Bartley, Waltham, MA (US); Zhonghui Xiao, Westford, MA (US); Carlos Mainemer, Nashua, NH (US)

(73) Assignee: Biscom, Inc., Westford, MA (US)

( * ) Notice: Subject to any disclaimer, the term of this patent is extended or adjusted under 35 U.S.C. 154(b) by 0 days.

(21) Appl. No.: 16/845,215

(22) Filed: Apr. 10, 2020

Related U.S. Application Data

(60) Provisional application No. 62/833,381, filed on Apr. 12, 2019.

(51) Int. Cl.
    *H04N 1/00* (2006.01)
    *H04N 1/32* (2006.01)

(52) U.S. Cl.
    CPC ....... *H04N 1/00214* (2013.01); *H04N 1/0022* (2013.01); *H04N 1/00209* (2013.01); *H04N 1/00244* (2013.01); *H04N 1/32149* (2013.01); *H04N 1/32406* (2013.01)

(58) Field of Classification Search
    None
    See application file for complete search history.

(56) References Cited

U.S. PATENT DOCUMENTS

| | | | | |
|---|---|---|---|---|
| 2004/0158733 A1* | 8/2004 | Bouchard | .......... | H04N 1/32416 726/28 |
| 2009/0259723 A1* | 10/2009 | Roic | .................... | G06Q 10/107 709/206 |
| 2010/0033760 A1* | 2/2010 | Kimura | .............. | H04N 1/32096 358/1.15 |
| 2010/0328723 A1* | 12/2010 | Kamekawa | .......... | H04N 1/4433 358/1.15 |
| 2011/0063215 A1* | 3/2011 | Mishima | ................ | G08C 17/00 345/158 |
| 2020/0412886 A1* | 12/2020 | Saito | ....................... | H04L 51/08 |

* cited by examiner

*Primary Examiner* — Miya J Williams
(74) *Attorney, Agent, or Firm* — Clocktower Law; Erik J. Heels; Michael A. Bartley

(57) ABSTRACT

Traditional fax servers may be improved to interoperate with secure fax servers, enabling high-resolution, color fax receipt by the traditional fax server in addition to traditional low-resolution, black-and-white fax receipt. A process for authenticating and registering allows the traditional fax server to receive digital faxes sent through the secure fax server. Further, an automated registration process allows sending to any existing fax number through the secure fax server. If no verified destination is known, a traditional fax is sent. If that reaches a interoperable traditional fax server, the number may be verified, digital fax retrieved, and all future faxes to that number through the secure fax server delivered as high-resolution color digital faxes. This enables seamless fax quality upgrades within existing fax servers.

16 Claims, 8 Drawing Sheets

DIGITAL FAXING THROUGH EXISTING FAX SERVERS

CROSS-REFERENCE TO RELATED APPLICATIONS

This utility patent application claims priority from U.S. provisional patent application Ser. No. 62/833,381, filed Apr. 12, 2019, titled "Digital Faxing Through Existing Fax Servers" and naming inventors George Bartley, Zhonghui Xiao, and Carlos Mainemer.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2020 Biscom.

BACKGROUND

Field of Technology

This relates to transmission of facsimile (fax) documents, or faxing, and more particularly to enabling digital fax through existing traditional fax servers.

Background

Faxing originated as telephonic transmission of documents as images. As technology has improved, faxing has improved from purely fax machine to fax machine, to include fax over IP, email-to-fax, and fax servers. Advantages of faxing, over other forms of document delivery, include security, immutability of image format, and reliability through confirmation of delivery. T.30 specifies the protocol for fax over phone lines (PSTN), with T.38 specifying a protocol for fax over IP that can support T.30 from both sender and receiver and relay over a packet network. However many issues with fax, grounded in the telephonic roots, remain. Fax protocols use a G3 encoded fax image format, which is low resolution in TIFF multi-page format. Faxing remains largely black-and-white, low resolution, non-instantaneous, and requires extensive error correction due to poor connections or lost data packets.

As illustrated in FIG. 1, Traditional fax servers operate to manage faxing and fax-driven workflows for organizations. Multiple lines for incoming and/or outgoing faxes may connect to a single traditional fax server. Faxes are received, processed, and routed to delivery destinations. Incoming and outgoing queue services, which are software modules or separate software programs, manage, order, and prioritize individual faxes enable traditional fax server operation in scenarios where the volume of faxes may exceed available phone lines. The queues may be operated on the traditional fax server, or on separate computers in network communication with the traditional fax server. Faxes and traditional fax servers are heavily relied on by medical, banking, and shipping organizations, yet retain the low quality and slow transmissions inherent with the T.30 and T.38 protocols.

What is needed, therefore, is a solution which non-disruptively merges traditional fax deployment with secure high-resolution, color, faxing including integration with existing traditional fax servers already embedded in organizational operations.

BRIEF SUMMARY

An improved fax solution enables traditional fax servers to interoperate with a secure fax server and receive high-resolution color digital faxes. Traditional fax servers may securely authenticate and retrieve digital faxes from the secure fax server. The secure fax server maintains a mapping between destination fax numbers and verified traditional fax servers. Any digital fax sent through the secure fax server to a verified number may be delivered as a digital fax. Any digital fax sent to an unverified fax number may be sent as a traditional fax. During cover page creation, the secure fax server may insert a symbol within the cover page indicating availability of a digital fax. If the traditional fax is received at a traditional fax server, during OCR processing the symbol may be recognized. After such recognition, the traditional fax server may authenticate with the secure fax server and register the fax number as verified to that fax server. The digital fax may then be retrieved and processed.

Features and Advantages

High-resolution, color, and secure digital faxing is enabled through existing fax servers.

Existing workflow and operational processes continue as configured without interruption, but benefit from higher quality color faxes.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

Figure 1:
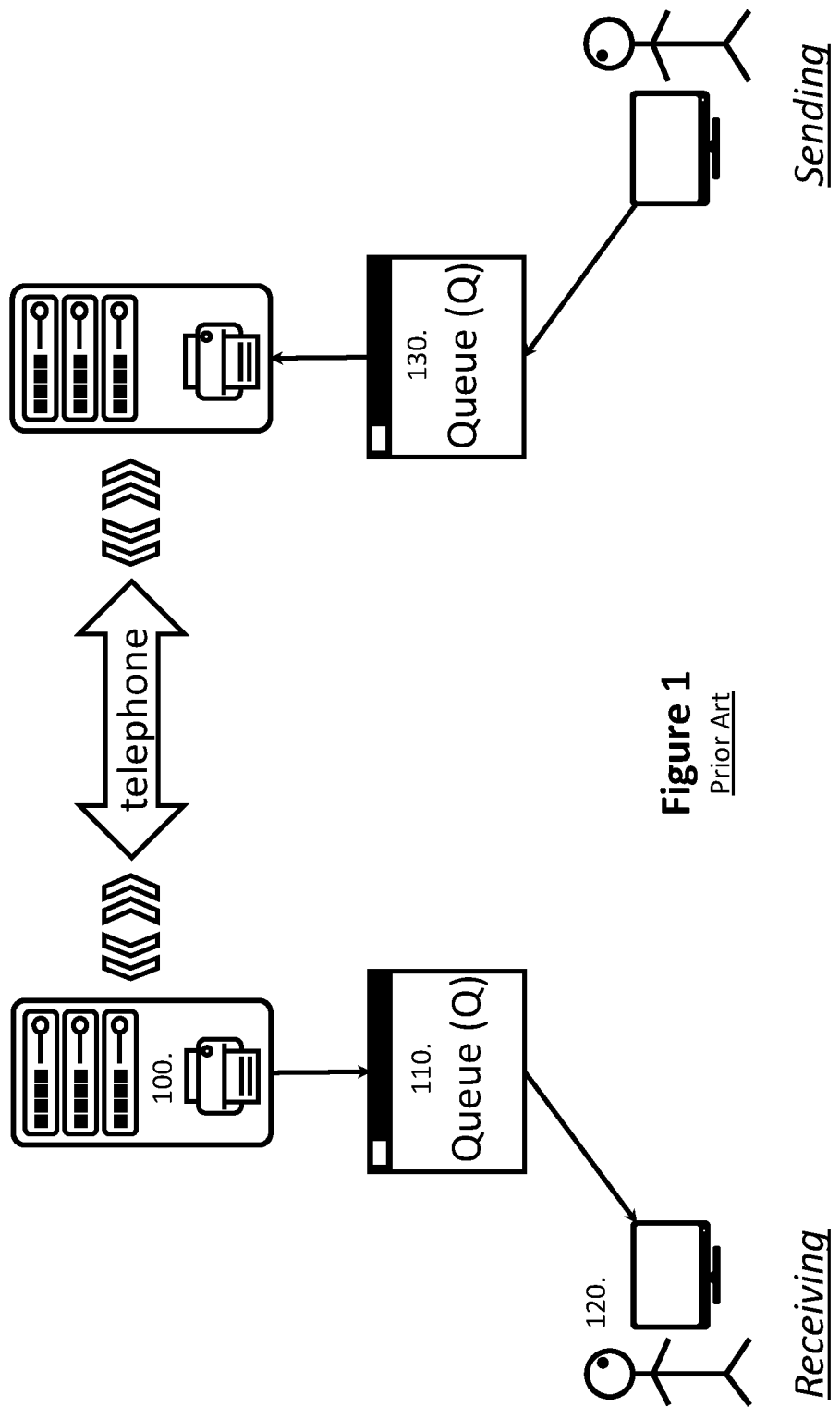
FIG. 1 is a diagram illustrating a typical prior art configuration sending and receiving traditional faxes through fax servers.

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current disclosure. Where there is a conflict, the following definitions apply.

A native document is an electronic file that includes editable text, for example, but not limited to, a document in pdf or doc format.

A fax document is an image format file where any text displayed within the image is not editable through a text editing program. Most commonly, but not exclusively, fax documents are in a multi-page TIFF format or image PDF. Fax documents are delivered, from sender to recipient, through a point-to-point secure communication session.

Traditional Fax—a fax document meeting standards for transmission over T.30 or T.38 protocols. Traditional faxes are black-and-white, with resolution of standard (200×100 dpi), fine (200×200 dpi), superfine (200×400 dpi), or ultra-fine (400×400 dpi).

Digital Fax—a fax document without black-and-white or resolution limitations. Digital faxes may be color and high resolution, but are not for transmission over T.30 or T.38 protocols.

Secure Fax Server—a server configured to securely receive native documents, process into a fax document, and deliver or make available as a digital fax to a recipient.

Fax Machine—computer device configured to receive traditional faxes over T.30 or T.38 protocol and print the traditional faxes at the computer device.

Traditional Fax Server—computer server configured to receive and send traditional faxes over T.30 or T.38 protocols. Multiple incoming and outgoing lines may be utilized by an individual traditional fax server. Incoming faxes are processed and routed to an end user, group, or delivery destination. As detailed herein, traditional fax servers may be modified to interoperate with secure fax servers to also receive and deliver digital faxes.

Operation

U.S. patent application Ser. No. 16/136,772, titled "High Resolution, Color Fax System", filed Sep. 20, 2018, and naming inventors Shu-Kuang Ho et al. describes a system for high-resolution, color faxes through a secure fax server, and is hereby fully incorporated by reference. In such a system, a Biscom Document Router device (BDR) is detailed for replacing traditional fax machines. Alternatives for originating and receiving faxes are also detailed. The secure fax server may be implemented with fax boards for fax over telephony or fax over IP, and deliver faxes to traditional fax servers. This may degrade the fax image quality (to black-and-white and low resolution) due to the limitation of traditional T.30 (fax over telephony) and T.38 (fax over IP) fax technology.

In order to deliver high resolution, color fax (hereinafter "digital fax") to traditional fax servers, coordination between a traditional fax server and the secure fax server is required. Referring to FIG. 1, in normal operation traditional fax server 100 operates to receive faxes to one or more fax numbers, and then deliver them to recipients. Incoming faxes are placed in queue 110 in order of arrival, and processed for delivery. Processing may involve optical character recognition (OCR) processing and barcode detection and reading on a cover page or complete fax document. The traditional fax server may maintain a mapping to end user recipients. Recipients 120 may be identified by individual fax number, or by other identifying routing information determined during processing. Once processing is complete, the fax is delivered to one or more identified end user recipients based on configured settings for each end user. Delivery may be in the form of email, which may be internal to an organization, printout to specific printer, electronic delivery to a computer workstation with software for viewing and acting on the fax in a workflow, or retransmission to a specific fax machine. Recipient end users may be individuals or other identifiable organizational groupings. For example, an individual department may have a single fax number, with the traditional fax server configured to deliver any faxes to that number by printout at a specific printer. In addition to the fax receiving processes, traditional fax servers may have outgoing queues 130 and document processing workflows for sending faxes.

Thus a traditional fax server has an OCR process, routing tables, user lists, and incoming and outgoing queues, along with telephone and network connections for connecting to telephone lines, internal networks, and the internet. To receive digital faxes, interoperability with a secure fax server is needed.

Figure 2:
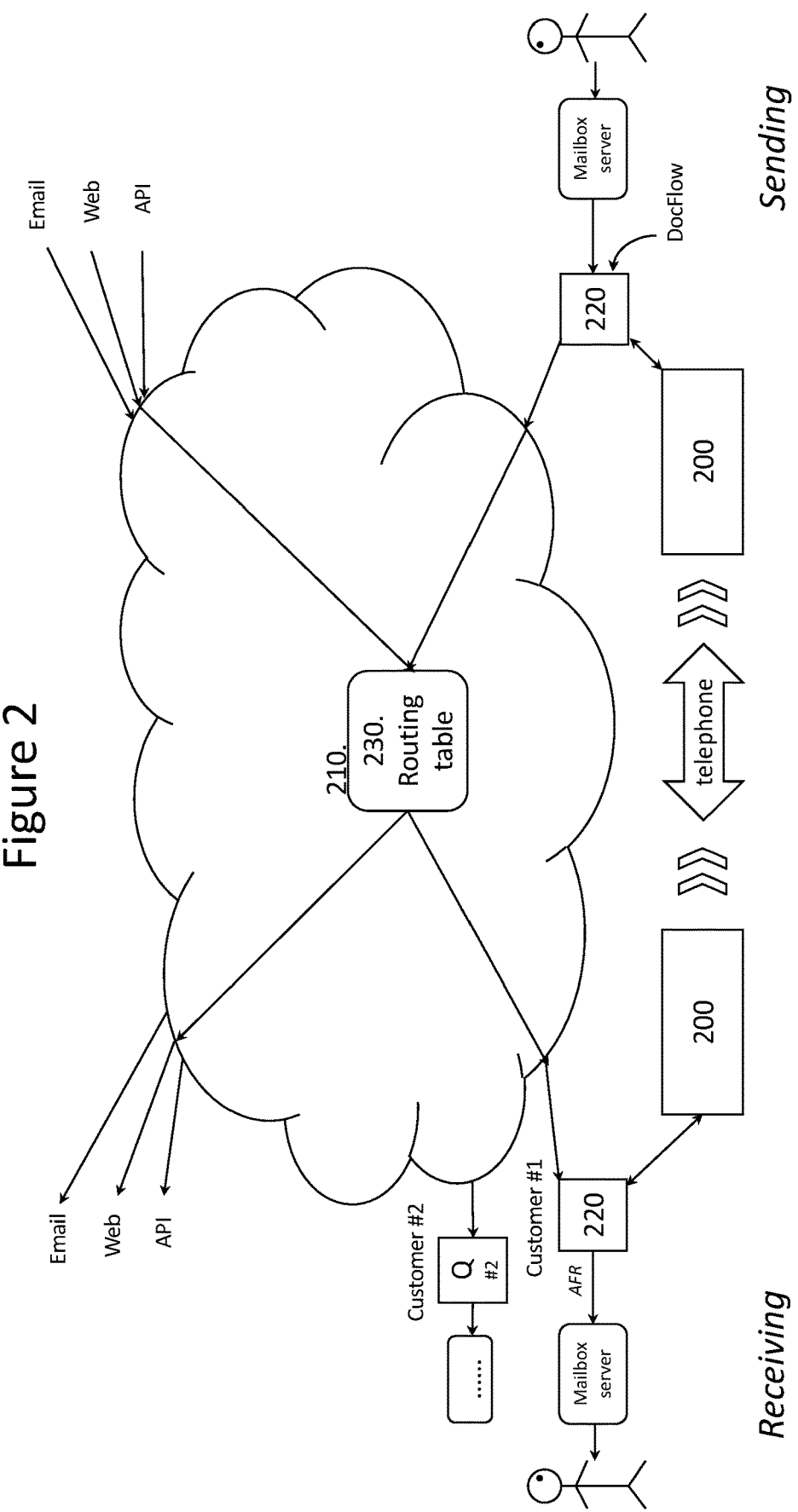
FIG. 2 is a diagram illustrating traditional fax servers to send and receive digital faxes through a secure fax server and send and receive traditional faxes across telephone lines.

Referring also to FIG. 2, the traditional fax server 200 may integrate with a secure fax server 210 through a secure fax server API to securely access and retrieve digital faxes. This may be implemented as a separate software module operating on the traditional fax server, or be included in software operating the incoming and outgoing workflow processes. In a preferred implementation, this is implemented as part of the Queue services.

Some traditional fax servers use a separate Queue system 220, where a separate Queue service software application manages workflow processes of sending and receiving faxes. These Queue services may be run on the traditional fax server, or run on computer systems separate from the traditional fax server. This enables separation of fax workflow processing from the system transmitting and receiving faxes. In general use, a Queue service is created for managing separate fax traffic of an organization's divisions based on business unit or application, with one Queue service for each division. Queue services integrate network and operating system specific components with traditional fax servers, and may dynamically load balance outbound faxes and manage failover conditions across multiple traditional fax servers. Multiple Queue services may be configured to operate with each traditional fax server. With a traditional fax server utilizing such Queue services, integration with the secure fax server preferably may be done by each Queue service. This directly connects each Queue service to the secure fax server, and when Queue services operate on separate computer systems removes load from processing digital faxes from the traditional fax server.

Figure 3:
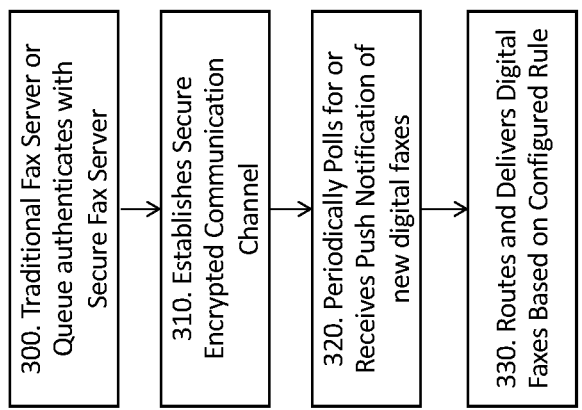
FIG. 3 is a flowchart detailing traditional fax server communication and operation with the secure fax server to receive digital faxes.

Referring also to FIG. 3, via the secure fax server API, the traditional fax server or specific Queue may authenticate 300 with the secure fax server and establish 310 secure encrypted communications to receive or transmit digital faxes across the internet. Authentication may be per user, pre Queue, or for the entire traditional fax server. Per user authentication may be configured by users by storing secure fax server login account information with a Queue service or on the traditional fax server, which the Queue or traditional fax server may use to retrieve digital faxes to that user received by the secure fax server, or by the user registering with the secure fax server and authorizing the traditional fax server to retrieve digital faxes. If authenticated for the entire traditional fax server, digital faxes to fax numbers that the secure fax server has confirmed to reach the traditional fax server may be delivered to the traditional fax server or directly to an associated incoming queue software module. Once authenticated, the secure fax server can be periodically polled or push 320 notifications about incoming digital faxes to the Queue or traditional fax server.

If retrieved by the traditional fax server, retrieval rules may be configured on a per-user or per-group basis, similar to traditional delivery and routing rules at the traditional fax server. Retrieval may be set to automatically retrieve and deliver 330 over the internal network based on routing rules (in which case the digital fax is retrieved by the traditional fax server and placed in delivery queue). The routing and document processing rules may be the same as those for traditional fax receipt, or may be configured differently. For example, rules may be in place to print traditional faxes to a certain number at a specific black-and-white printer, but to print digital faxes to the same number at a color printer. Alternatively, the rules may be configured to merely deliver notification to a user or group of users that a digital fax has arrived, and leave retrieval to the end recipient(s) via login or other access method the secure fax server.

Figure 4:
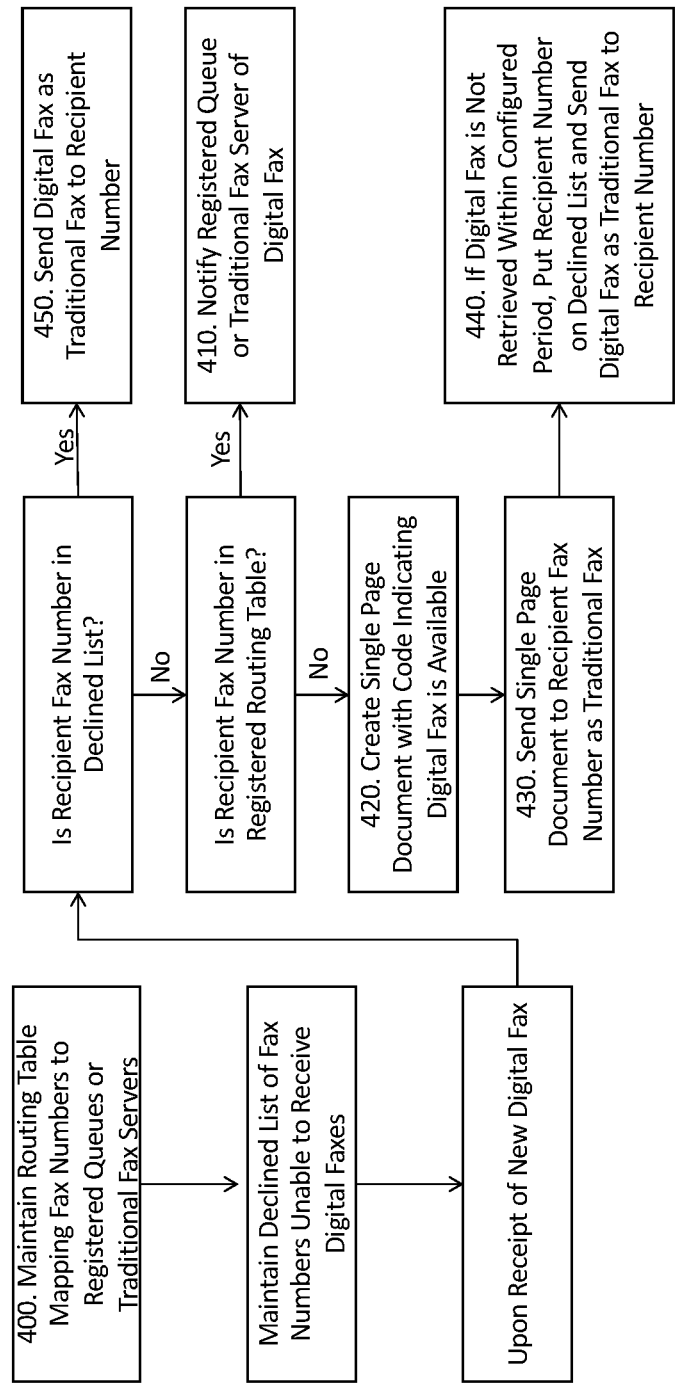
FIG. 4 is a flowchart detailing secure fax server operations to deliver a new digital fax.
Figure 5:
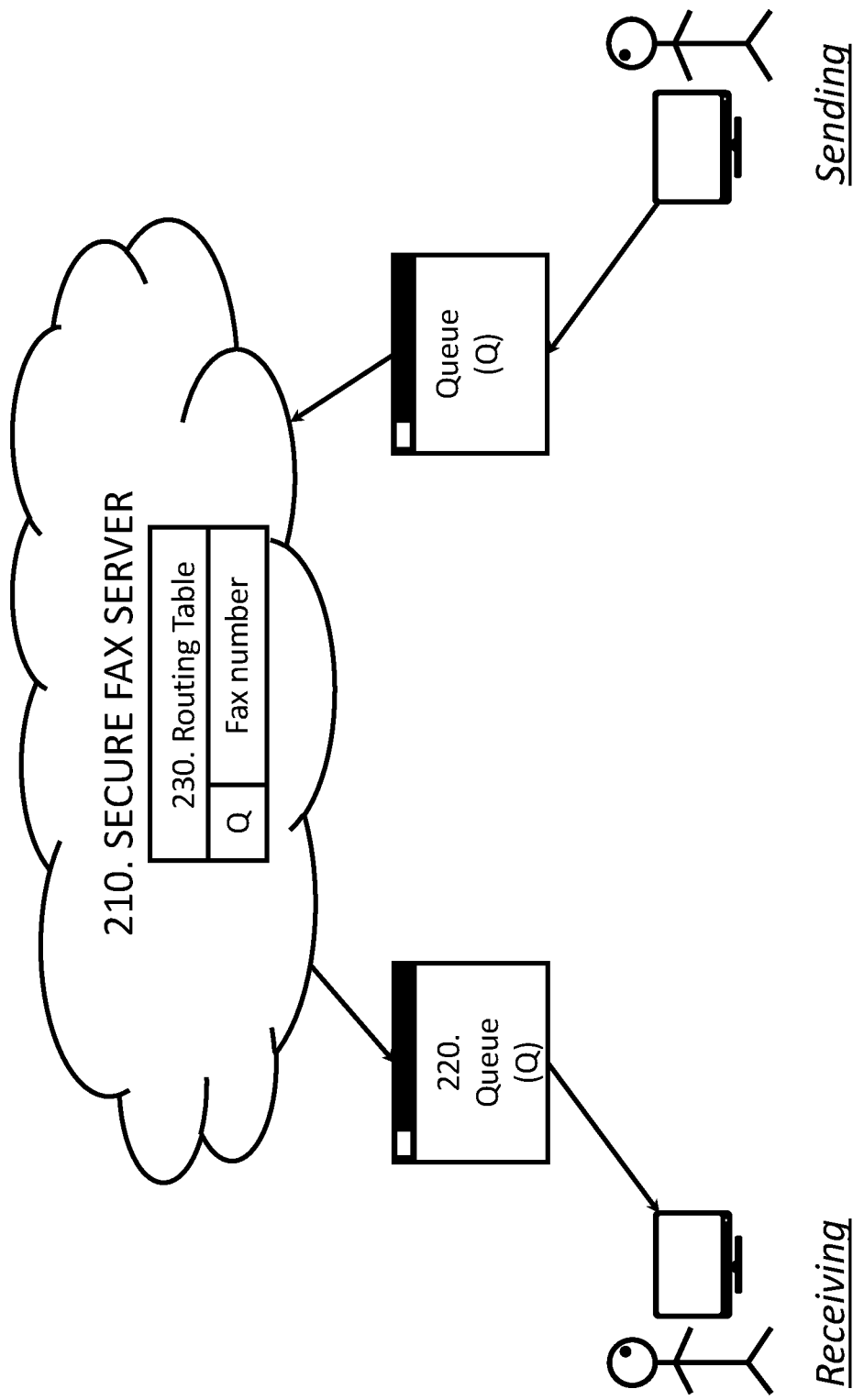
FIG. 5 is a diagram illustrating sending a digital fax from a user of a traditional fax server with an outgoing queue, through the secure fax server, and to a recipient of a traditional fax server with an incoming queue.

Referring also to FIGS. 4 & 5, secure fax server 210 may maintain 400 a routing table 230 mapping fax numbers to traditional fax servers, individual users, or queues which have registered with the secure fax server. Upon receipt at the secure fax server of a digital fax, or native documents which are converted into a digital fax, where the recipient fax number is in the mapping table, the secure fax server may use the routing table mapping to notify 410 or directly deliver the digital fax to the recipient user, queue 220, or traditional fax server.

Figure 6:
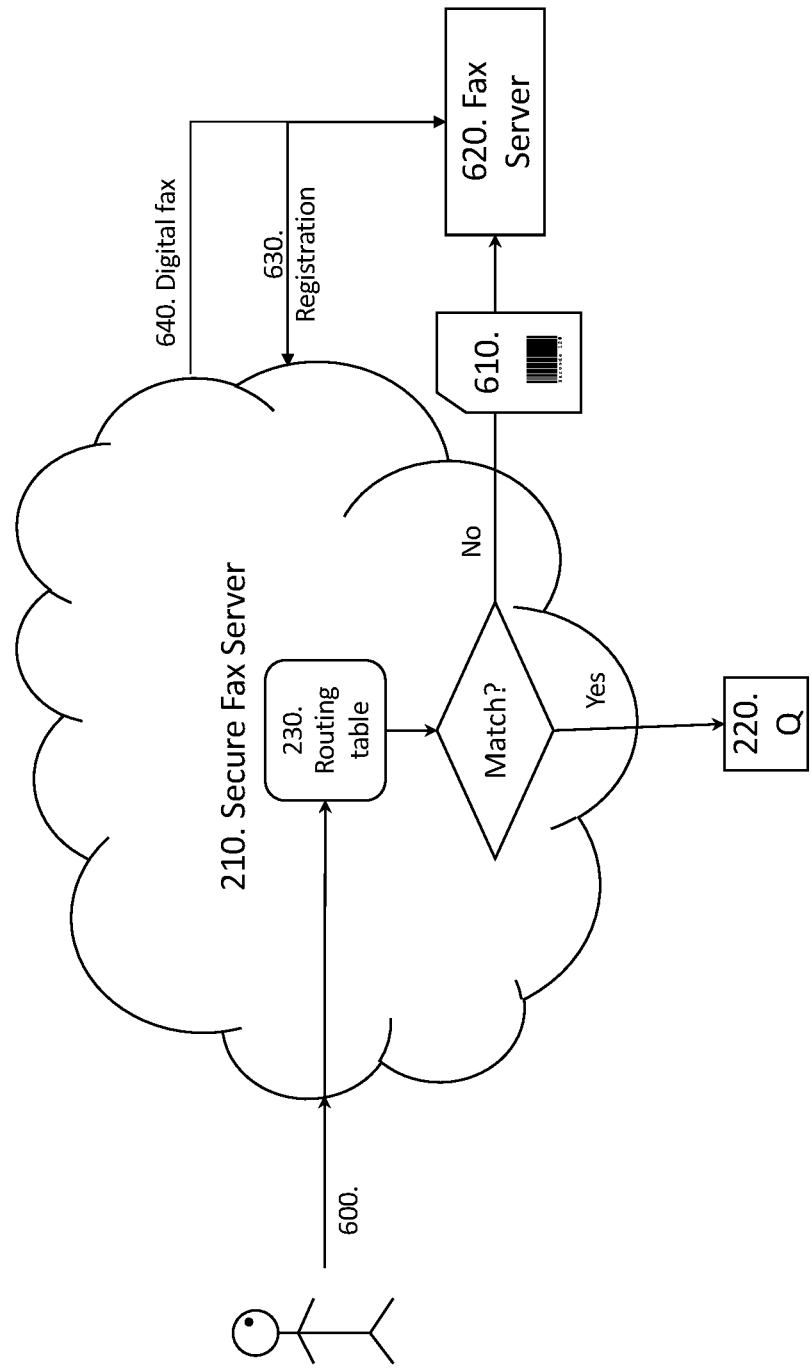
FIG. 6 is a diagram illustrating sending a digital fax to a recipient through a traditional fax server where the recipient fax number is not initially registered to receive digital faxes.
Figure 7:
FIG. 7 is an illustration of an example single page document for faxing with barcode indicating availability of a digital fax.
Figure 8:
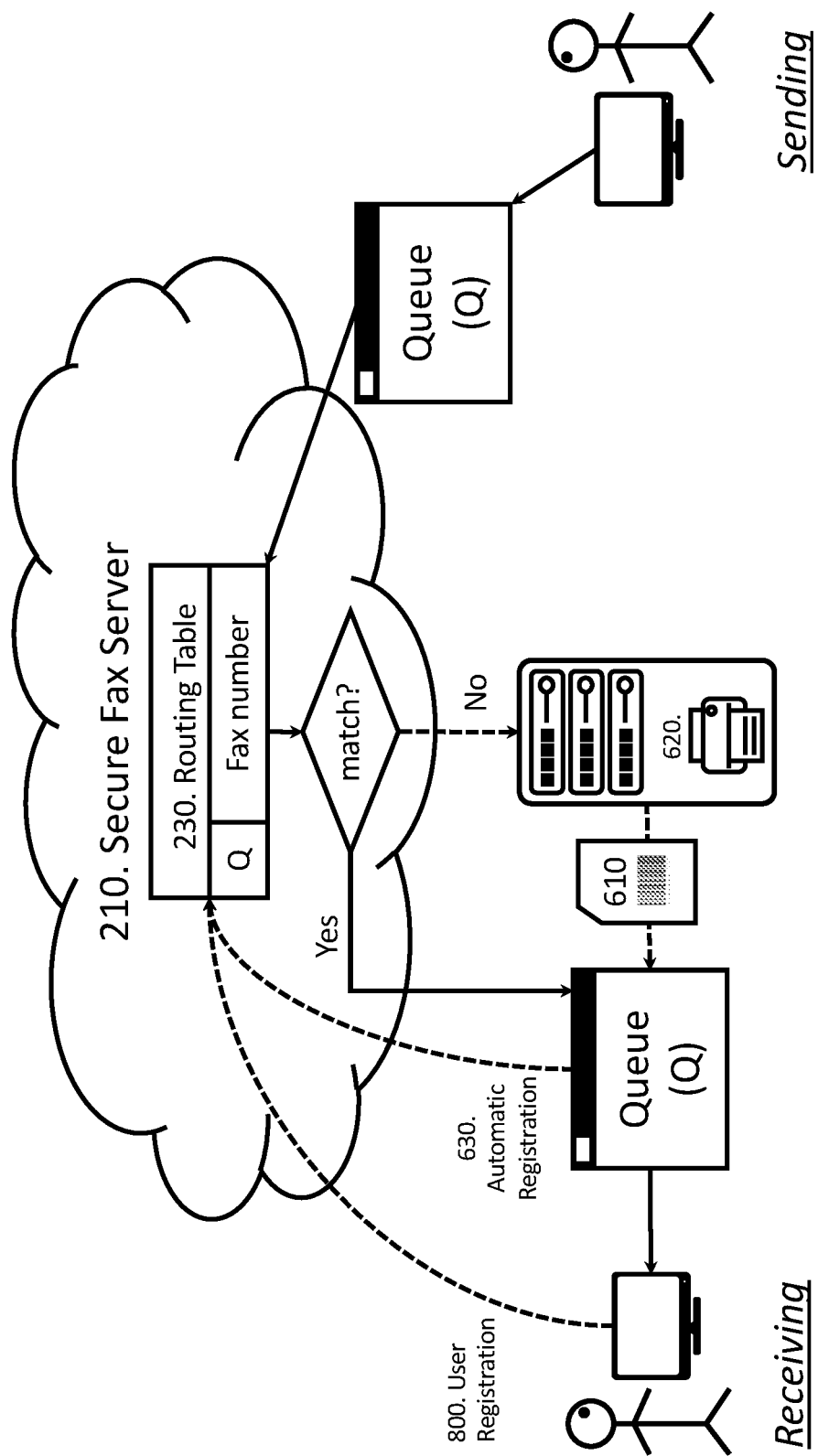
FIG. 8 is a diagram illustrating sending a digital fax to a recipient where the recipient fax number has previously registered to receive digital faxes.

Referring also to FIGS. 6, 7, & 8, when the secure fax server receives native documents 600 to be sent as a digital fax to a destination fax number which is not in the mapping table, the secure fax server may create 420 a single page document 610 with a barcode, QR code, or other indication recognizable through OCR that a high-quality digital fax is available on the secure fax server. In addition or alternative to the barcode, QR code, or other indication, the single page document may be created to include text instructions for creating an account on the secure fax server and retrieving the digital fax. This single page document is then sent 430 as a traditional fax from the secure fax server to the destination fax number. If it reaches a destination which does not interoperate with the secure fax server, the one page document fax will print or otherwise reach its destination, and if the text instructions were included they may be readable by the recipient to register with the secure fax server to access and retrieve the digital fax. If the digital fax remains unaccessed and not retrieved from the secure fax server for more than a configurable period (e.g., 12 hours, or 2 days), the secure fax server may deliver 440 the digital fax as a traditional T.30 or T.38 fax to the destination number. The secure fax server may further add the number to a declined list tracking destination fax numbers which do not receive digital faxes. Any fax to a number on the declined list may bypass the digital fax delivery process and be sent 450 directly as a traditional T.30 or T.38 fax.

When the single page document fax is received at a traditional fax server 620 which interoperates with the secure fax server, during the OCR process and barcode detection, the traditional fax server software may recognize the inserted barcode, QR code, or other indication that a digital fax is available. Upon recognition, the traditional fax server or appropriate Queue may, via the secure fax server API, communicate with the secure fax server API and register 630 the destination fax number as being received by the traditional fax server or appropriate Queue. The secure fax server may update its fax number mapping table indicating that the destination fax number is confirmed to reach the registered traditional fax server or Queue. The secure fax server may then deliver the digital fax 640 directly to the Queue, or to the traditional fax server, which the traditional fax server may then process and place in an incoming fax queue. If the traditional fax server and Queue have not registered, and the single page fax document includes text instructions for user registration 800, the recipient may register with the secure fax server to retrieve the digital fax.

In addition to interoperating with the secure fax server to receive digital faxes, the traditional fax server may enable sending digital faxes through the secure fax server. This may be an option configured on a per-fax basis, or configured for default operation on a per-user, per-group, or per-server basis. When digital fax sending is enabled, outgoing fax generation by the traditional fax server may instead upload native documents to the secure fax server via the secure fax server API. Cover page and recipient information my similarly be provided to the secure fax server via API, based on the same cover page and recipient information the traditional fax server would use in sending the fax. Any status and sending information, such as any delivery errors and when accessed information, may be provided from the secure fax server to the traditional fax server such that the traditional fax server provides the same status information for the digital fax that it would provide for a traditional fax. The digital fax sending communication with the digital fax server may also be implemented within an outgoing Queue service or software module, allowing processing the delivery to the secure fax server directly.

Other Embodiments

In another alternate embodiment, if the sending fax server or Queue service interoperates with the secure fax server, and sends a digital fax for delivery through the secure fax server, the secure fax server may notify the sending fax server or Queue service if the destination number is on the declined list. After such notification, the sending fax server or Queue service may follow traditional T.30 or T.38 fax sending processes to transmit the fax directly to the destination number bypassing the secure fax server. Additionally, the traditional fax server or Queue service my maintain its own list of destination numbers that have declined receiving digital faxes, and include the newly declined destination number in such list. Any outgoing fax to a number in such list may be processed and transmitted as a traditional T.30 or T.38 fax without further involvement of the secure fax server.

In another alternate embodiment, when the secure fax server receives native documents to be sent as a digital fax to a destination fax number which is not in the mapping table, the secure fax server may deliver it to that number as a traditional T.30 fax. When creating the cover page, the secure fax server may insert a symbol such as a barcode, QR code, or other indication recognizable through OCR that a high-quality digital fax is available on the secure fax server. If the destination fax number is for a traditional fax machine, the cover page and fax may print as normal. If the destination fax number reaches a traditional fax server running software which interoperates with the secure fax server, the digital fax may be retrieved instead.

When the T.30 fax is received by the traditional fax server it enters the normal fax processing workflow. During the OCR process and or barcode detection, the traditional fax server software may recognize the inserted symbol. Upon recognition, via the secure fax server API the traditional fax server software or incoming Queue may communicate with the secure fax server API and register the destination fax number as being received by the traditional fax server or Queue. The secure fax server may update its fax number mapping table indicating that the destination fax number is confirmed to reach the traditional fax server or Queue. The secure fax server may then deliver the digital fax to the traditional fax server or Queue.

The described alternate embodiments may be implemented separately from, or in any combination with, each other as well as the described preferred embodiment. For example, some traditional servers may directly interoperate with the secure fax server, while others may interoperate through use of Queue services.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

What is claimed is:

1. A method for digital faxing comprising:
a secure fax server maintaining a routing table mapping fax numbers to registered queues, traditional fax servers, and end users;
the secure fax server maintaining a declined list of fax numbers which are unable to receive digital fax;
receiving one or more native documents at the secure fax server for delivery as a digital fax to a recipient fax number;
when the recipient fax number is in the declined list, the secure fax server transmitting the digital fax as a traditional fax to the recipient fax number;
when the recipient fax number is in the routing table:
when the recipient fax number is mapped to a specific end user, the secure fax server sending notice to the specific end user of the digital fax;
when the recipient fax number is mapped to a specific queue, pushing the digital fax or notification of the digital fax to the specific queue; and
when the recipient fax number is mapped to a specific traditional fax server, pushing the digital fax or notification of the digital fax to the specific traditional fax server; and
when the recipient fax number is not in the routing table and not in the declined list:
the secure fax server creating a single page document with an indication recognizable through optical character recognition that a digital fax is available on the secure fax server;
the secure fax server sending the single page document as a traditional fax to the recipient fax number;
when a specific user, a specific fax server, or a specific queue registers with the secure fax server in response to receiving the fax document, registering the specific user, the specific fax server, or the specific queue in the routing table as mapped to the recipient fax number and delivering the digital fax; and
when the digital fax is not retrieved within a preconfigured period, adding the recipient fax number to the declined list and sending the digital fax as a traditional fax to the recipient fax number.

2. The method of claim 1, further comprising the secure fax server inserting a barcode into the single page document as the indication recognizable through optical character recognition.

3. The method of claim 1, further comprising the secure fax server inserting a quick response (QR) code into the single page document as the indication recognizable through optical character recognition.

4. The method of claim 1, further comprising the secure fax server inserting, into the single page document as the indication recognizable through optical character recognition, text instructions to create an account at the secure fax server.

5. The method of claim 1, further comprising:
receiving, at a traditional fax server, the traditional fax of the single page document;
processing the traditional fax through optical character recognition;
recognizing the indication that the digital fax is available on the secure fax server;
registering with the secure fax server; and
receiving and processing the digital fax.

6. The method of claim 5, further comprising operating a queue service in communication with the traditional fax server, and registering and communicating with the secure fax server through the queue service.

7. The method of claim 6, further comprising sending an outgoing fax by:
delivering one or more outgoing native documents to the queue service;
transmitting the one or more outgoing native documents and a destination fax number from the queue service to the secure fax server for processing and delivery as a digital fax.

8. The method of claim 7, further comprising the queue service maintaining a digital fax declined list of destination numbers, and if the destination fax number is on the digital fax declined list, sending to the traditional fax server for transmission as a traditional fax instead of transmitting to the secure fax server.

9. A digital fax system comprising:
a secure fax server maintaining a routing table mapping fax numbers to registered queues, traditional fax servers, and end users, and also maintaining a declined list of fax numbers which are unable to receive digital fax;
a traditional fax server processing faxes to a recipient fax number;
wherein the secure fax server further comprises a computer processor operating software code such that upon receipt of one or more native documents at the secure fax server for delivery as a digital fax to the recipient fax number:
when the recipient fax number is in the declined list, the secure fax server transmits the digital fax as a traditional fax to the recipient fax number;
when the recipient fax number is in the routing table:
when the recipient fax number is mapped to a specific end user, the secure fax server sends notice to the specific end user of the digital fax;
when the recipient fax number is mapped to a specific queue service associated with the traditional fax server, the secure fax server pushes the digital fax or notification of the digital fax to the specific queue service; and
when the recipient fax number is mapped to the traditional fax server, the secure fax server pushes the digital fax or notification of the digital fax to the traditional fax server; and when the recipient fax number is not in the routing table and not in the declined list:

the secure fax server creates a single page document with an indication recognizable through optical character recognition that a digital fax is available on the secure fax server;

the secure fax server sends the single page document as a traditional fax to the recipient fax number;

when a specific user, the traditional fax server, or a specific queue registers with the secure fax server in response to receiving the fax document, the secure fax server registers the specific user, the traditional fax server, or the specific queue in the routing table as mapped to the recipient fax number and delivers the digital fax; and when the digital fax is not retrieved within a preconfigured period, the secure fax server adds the recipient fax number to the declined list and sends the digital fax as a traditional fax to the recipient fax number.

10. The system of claim 9, wherein operating software code further comprises software code such that the secure fax server inserts a barcode into the single page document as the indication recognizable through optical character recognition.

11. The system of claim 9, wherein operating software code further comprises software code such that the secure fax server inserts a quick response (QR) code into the single page document as the indication recognizable through optical character recognition.

12. The system of claim 9, wherein operating software code further comprises software code such that the secure fax server inserts, into the single page document as the indication recognizable through optical character recognition, text instructions to create an account at the secure fax server.

13. The system of claim 9, wherein the traditional fax server further comprises a computer processor operating software code to:

receive the traditional fax of the single page document;

process the traditional fax through optical character recognition;

recognize the indication that the digital fax is available on the secure fax server;

register with the secure fax server; and receive and process the digital fax.

14. The system of claim 9, further comprising:

a queue service in communication with the traditional fax server, the queue service operating software code to register and communicate with the secure fax server through the queue service; and wherein the traditional fax server further comprises a computer processor operating software code to:

receive the traditional fax of the single page document; and process the traditional fax through optical character recognition.

15. The system of claim 14, wherein the queue service operating software code further comprises operating software code to transmit one or more outgoing native documents and a destination fax number to the secure fax server for processing and delivery as a digital fax.

16. The system of claim 15, wherein the queue service operating software code further comprises operating software code to maintain a digital fax declined list of destination numbers, and if the destination fax number is on the digital fax declined list, sending to the traditional fax server for transmission as a traditional fax instead of transmitting to the secure fax server.

* * * * *